United States Patent
Kim et al.

(10) Patent No.: US 7,843,881 B2
(45) Date of Patent: *Nov. 30, 2010

(54) SYSTEM FOR PACKET DATA SERVICE IN THE MIXED NETWORK OF ASYNCHRONOUS COMMUNICATION NETWORK AND SYNCHRONOUS COMMUNICATION NETWORK AND HAND-OVER METHOD THEREOF

(75) Inventors: Hyun-Wook Kim, Seongnam-si (KR); Young-Lak Kim, Yongin-si (KR); Nam-Gun Kim, Seoul (KR); Jong-Tae Ihm, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 986 days.

This patent is subject to a terminal disclaimer.

(21) Appl. No.: 10/585,403

(22) PCT Filed: Jan. 7, 2005

(86) PCT No.: PCT/KR2005/000050

§ 371 (c)(1),
(2), (4) Date: Jan. 19, 2007

(87) PCT Pub. No.: WO2005/067178

PCT Pub. Date: Jul. 21, 2005

(65) Prior Publication Data

US 2007/0259667 A1     Nov. 8, 2007

(30) Foreign Application Priority Data

Jan. 8, 2004   (KR) .................. 10-2004-0001283
Jan. 8, 2004   (KR) .................. 10-2004-0001284

(51) Int. Cl.
*H04W 4/00* (2009.01)

(52) U.S. Cl. .............. 370/331; 370/310; 370/328; 370/350; 455/436; 455/439

(58) Field of Classification Search ............ 455/560, 455/432.1, 432.2, 436–444, 550.1, 552.1; 370/310, 331, 332, 328, 350
See application file for complete search history.

(56) References Cited

U.S. PATENT DOCUMENTS 6,389,008 B1 * 5/2002 Lupien et al. .............. 370/352

(Continued)

FOREIGN PATENT DOCUMENTS

EP            1104974            6/2001

(Continued)

OTHER PUBLICATIONS

International Search Report dated Apr. 29, 2005 for PCT/KR2005/000050.

(Continued)

*Primary Examiner*—Kamran Afshar
*Assistant Examiner*—Babar Sarwar
(74) *Attorney, Agent, or Firm*—Lowe Hauptman Ham & Berner LLP

(57) ABSTRACT

Disclosed herein is a mobile communication terminal and handover method therefor, which enable handover of a mobile communication terminal that is using a packet data service or is in a dormant state in a mobile communication network in which asynchronous and synchronous networks coexist. In the handover method, if a channel is assigned between a mobile communication terminal and a synchronous mobile communication system in response to a request from an asynchronous mobile communication system as a mobile communication terminal using packet data service in the asynchronous mobile communication system moves into an area of the synchronous mobile communication system, call setup is performed. A node B of the asynchronous mobile communication releases a connection to the mobile communication system and assigns a new mobile IP to the mobile communication terminal, thus providing continuous packet data service to the mobile communication terminal.

12 Claims, 11 Drawing Sheets

U.S. PATENT DOCUMENTS

| | | | |
|---|---|---|---|
| 6,704,581 B1 * | 3/2004 | Park et al. | 455/553.1 |
| 6,975,608 B1 * | 12/2005 | Park et al. | 370/332 |
| 7,421,203 B2 * | 9/2008 | Kim et al. | 398/59 |
| 2002/0068565 A1 | 6/2002 | Purnadi et al. | |
| 2004/0106408 A1 * | 6/2004 | Beasley et al. | 455/436 |
| 2007/0258405 A1 * | 11/2007 | Kim et al. | 370/331 |
| 2007/0259667 A1 * | 11/2007 | Kim et al. | 455/440 |
| 2008/0037470 A1 * | 2/2008 | Kim et al. | 370/331 |
| 2008/0056190 A1 * | 3/2008 | Kim | 370/331 |
| 2008/0095111 A1 * | 4/2008 | Kim et al. | 370/331 |
| 2008/0117874 A1 * | 5/2008 | Park et al. | 370/331 |
| 2008/0137607 A1 * | 6/2008 | Ju et al. | 370/331 |
| 2008/0146228 A1 * | 6/2008 | Kim et al. | 455/436 |
| 2008/0219212 A1 * | 9/2008 | Kim | 370/331 |
| 2008/0242304 A1 * | 10/2008 | Ju et al. | 455/439 |
| 2008/0254796 A1 * | 10/2008 | Kim et al. | 455/436 |
| 2008/0287131 A1 * | 11/2008 | Ju et al. | 455/439 |
| 2009/0129359 A1 * | 5/2009 | Lee et al. | 370/342 |

FOREIGN PATENT DOCUMENTS

| | | |
|---|---|---|
| JP | 2001-186552 | 7/2001 |
| WO | WO 00/51393 | 8/2000 |
| WO | WO 03/052970 | 6/2003 |
| WO | 03/079716 | 9/2003 |

OTHER PUBLICATIONS

Japanese Office Action dated Jun. 8, 2010, for application No. 2006-549119, citing the attached reference(s).

* cited by examiner

SYSTEM FOR PACKET DATA SERVICE IN THE MIXED NETWORK OF ASYNCHRONOUS COMMUNICATION NETWORK AND SYNCHRONOUS COMMUNICATION NETWORK AND HAND-OVER METHOD THEREOF

CROSS REFERENCE TO RELATED APPLICATION

This application is the National Phase application of International Application No. PCT/KR2005/000050, filed Jan. 7, 2005, which designates the United States and was published in English. This application, in its entirety, is incorporated herein by reference.

TECHNICAL FIELD

The present invention relates, in general, to a handover method in a mobile communication network and, more particularly, to a mobile communication system and handover method thereof, which enable handover of a mobile communication terminal that is using a packet data service or is in a dormant state in a mobile communication network in which asynchronous and synchronous networks coexist.

BACKGROUND ART

With the development of mobile communication technology, a mobile communication network changes every generation. Currently, a network adopts a structure in which a synchronous mobile communication system (Code Division Multiple Access [CDMA] mobile communication system), designated as second generation or 2.5-th generation network, and an asynchronous mobile communication system (Wideband CDMA [WCDMA] mobile communication system), designated as a third generation network, coexist.

Further, in order to support global roaming between mobile communication systems, a Dual-Band Dual-Mode (DBDM) mobile communication terminal capable of being used in both a synchronous mode system and an asynchronous mode system has been developed. By using the mobile communication terminal, different types of services can be used in asynchronous and synchronous mode system areas.

Currently, an asynchronous mobile communication system is being constructed in areas having a great number of service requests, so that a synchronous mode mobile communication system has been developed into a form in which the service area thereof includes service areas of an asynchronous mode system. However, since the asynchronous mobile communication system is still in an initial stage and requires enormous investment to be implemented, the service cannot be provided to a wide area, so that the service area of an asynchronous mobile communication system overlaps with that of a synchronous mobile communication system.

Accordingly, since the service area of the asynchronous mobile communication system is limited, there is a problem in that service is interrupted when a subscriber to the asynchronous mobile communication system moves into a synchronous area, in which an asynchronous mobile communication service cannot be provided, during the use of the packet data service in an asynchronous area.

As described above, if asynchronous and synchronous mobile communication systems coexist and the service area of the asynchronous mobile communication system is smaller than that of the synchronous mobile communication system, handover is required to provide continuous packet data service between the asynchronous and synchronous mobile communication systems.

DISCLOSURE OF THE INVENTION

Accordingly, the present invention has been made keeping in mind the above problems occurring in the prior art, and an object of the present invention is to provide a mobile communication system and handover method thereof, which provide continuous packet data service when a mobile communication terminal that is using a packet data service in an asynchronous network moves into a synchronous network, thus preventing service interruption.

BEST MODE FOR CARRYING OUT THE INVENTION

Figure 1:
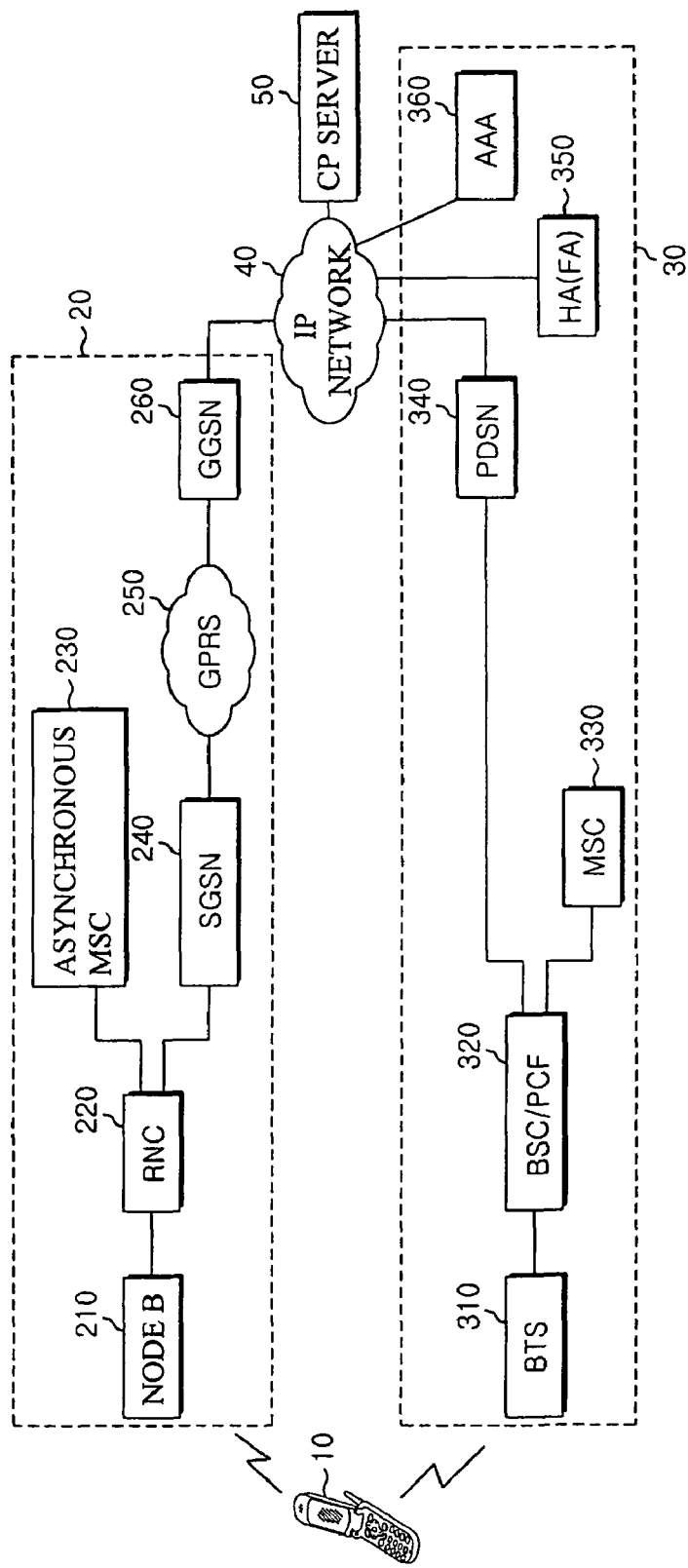
FIG. 1 is a view showing the configuration of a mobile communication network to which the present invention is applied.

In order to accomplish the above object the present invention provides a handover method for providing a packet data service to a dual-band dual-mode mobile communication terminal having an asynchronous modem unit and a synchronous modem unit in a mobile communication network in which asynchronous and synchronous mobile communication systems coexist, the method comprising the first step of, as the mobile communication terminal in a dormant state with respect to the asynchronous mobile communication system moves into an area of the synchronous mobile communication system, a Serving General packet radio service (GPRS) Support Node (SGSN)/Gateway GPRS Support Node (GGSN) of the asynchronous mobile communication system receiving information indicating that handover is required; the second step of the SGSN/GGSN commanding a base station of the synchronous mobile communication system to perform handover, the third step of the mobile communication terminal attempting to originate a call to the base station, thus executing call processing and channel assignment between the base station and a mobile switching center of the synchronous mobile communication system; the fourth step of performing a negotiation related to call processing and setup between the mobile communication terminal and the base station; the fifth step of the synchronous mobile communication system setting up a trunk; the sixth step of initializing a radio link protocol between the mobile communication terminal and the base station; the seventh step of the base station notifying the mobile switching center that channel assignment has been completed; the eighth step of setting up a packet data call between the mobile communication terminal and a packet data service node of the synchronous mobile communication system; and the ninth step of the synchronous mobile communication system assigning a mobile IP to the mobile communication terminal.

Further, the present invention provides a handover method for providing a packet data service to a dual-band dual-mode mobile communication terminal having an asynchronous modem unit and a synchronous modem unit in a mobile communication network in which asynchronous and synchronous mobile communication systems coexist the method comprising the first step of, as the mobile communication terminal that is connected to the asynchronous mobile communication system and using a packet data service moves into an area of the synchronous mobile communication system, and a handover event occurs, a node B of the asynchronous mobile communication system notifying a Serving General packet radio service (GPRS) Support Node (SGSN)/Gateway GPRS Support Node (GGSN) of the asynchronous mobile communication system that handover is required; the second step of the SGSN/GGSN requesting a mobile switching center of the synchronous mobile communication system to perform handover, and the mobile switching center requesting the base station of the synchronous mobile communication system to perform handover, the third step of the synchronous mobile communication system performing a procedure of setting control signals and traffic for transmission of packet data; the fourth step of the base station notifying the mobile switching center that handover has been completed, and assigning a forward channel to the mobile communication terminal; the fifth step of the mobile switching center notifying the SGSN/GGSN that handover has been completed; the sixth step of, as the SGSN/GGSN commands the node B to perform handover, the node B directing the mobile communication terminal to perform handover, the seventh step of the mobile communication terminal notifying the base station that handover has been completed if a reverse channel has been assigned and a connection has been established between the mobile communication terminal and the synchronous mobile communication system; the eighth step of the synchronous mobile communication system performing call setup for a packet data service; the ninth step of the base station notifying the synchronous mobile switching center that handover has been completed, and the mobile switching center notifying the SGSN/GGSN that handover has been completed; the tenth step of the SGSN/GGSN requesting the node B to release a connection to the mobile communication terminal; the eleventh step of the mobile communication terminal establishing a PPP with the packet data service node of the synchronous mobile communication system; and the twelfth step of assigning a mobile IP to the mobile communication terminal.

Hereinafter, embodiments of the present invention will be described in detail with reference to the attached drawings.

FIG. 1 is a view showing the configuration of a mobile communication network according to the present invention, in which the mobile communication network is depicted on the basis of components used to provide a packet data service.

A mobile communication terminal 10 applied to the present invention is a Dual-Band Dual-Mode (hereinafter referred to as DBDM) mobile communication terminal, which can be provided with both an asynchronous mobile communication service and a synchronous mobile communication service. The mobile communication terminal is selectively connected to an asynchronous mobile communication system 20 and a synchronous mobile communication system 30 in a wireless manner, thus using voice and data services. A detailed description thereof will be described later with reference to FIGS. 2 and 3.

The asynchronous mobile communication system 20 includes a node B 210 functioning as a base station to perform wireless section communication with the mobile communication terminal 10, a Radio Network Controller (RNC) 220 for controlling the node B 210, an asynchronous Mobile Switching Center (MSC) 230 connected to the RNC 220 to perform call switching so as to provide voice service to the mobile communication terminal 10, a Serving GPRS Support Node (SGSN) 240 disposed between the RNC 220 and a General Packet Radio Service (GPRS) network 250 to track the location of the mobile communication terminal 10 and perform access control and security functions, and a Gateway GPRS Support Node (GGSN) 260 connected to the SGSN 240 through the GPRS network 250 and connected to an IP network 40 to support interworking with external packets. Further, the synchronous mobile communication system 30 includes a Base Transceiver Station (BTS) 310 for supporting wireless section communication with the mobile communication terminal 10, a Base Station Controller (BSC) for controlling the BTS 310 and a packet controller (Packet Control Function: PCF) 320 for performing a function similar to that of the BSC at the time of providing a packet data service, such as the management of radio resources for the packet data service, a Mobile Switching Center (USC) 330 connected to one or more base station controllers to perform call switching, a Packet Data Service Node (PDSN) 340 connected to the packet controller 320 to establish a Point-to-Point Protocol (PPP) session with the mobile communication terminal 10, interface with an external node, and perform a Foreign Agent (FA) function for the location registration of the mobile communication terminal 10 so as to provide a packet data service to a subscriber, a Data Core Network (DCN) (not shown) for supporting the interface between the packet data service node 340 and the IP network 40, a home agent 350 for authenticating the mobile communication terminal 10 and transmitting packet data to a foreign agent, and an Authentication Authorization Account (AAA) unit 360 for performing authentication, authorization and account functions for the mobile communication terminal.

Although not shown in the drawing, the MSCs 230 and 330 of the asynchronous mobile communication system 20 and the synchronous mobile communication system 30 are connected to each other through a No. 7 common channel signaling network to transmit and receive information required for handover of the mobile communication terminal 10, etc. therebetween.

In such a mobile communication system, the mobile communication terminal 10 of the present invention is selectively connected to the asynchronous mobile communication system 20 and the synchronous mobile communication system 30 and transmits and processes signal processing status with respect to the two systems.

Figure 2:
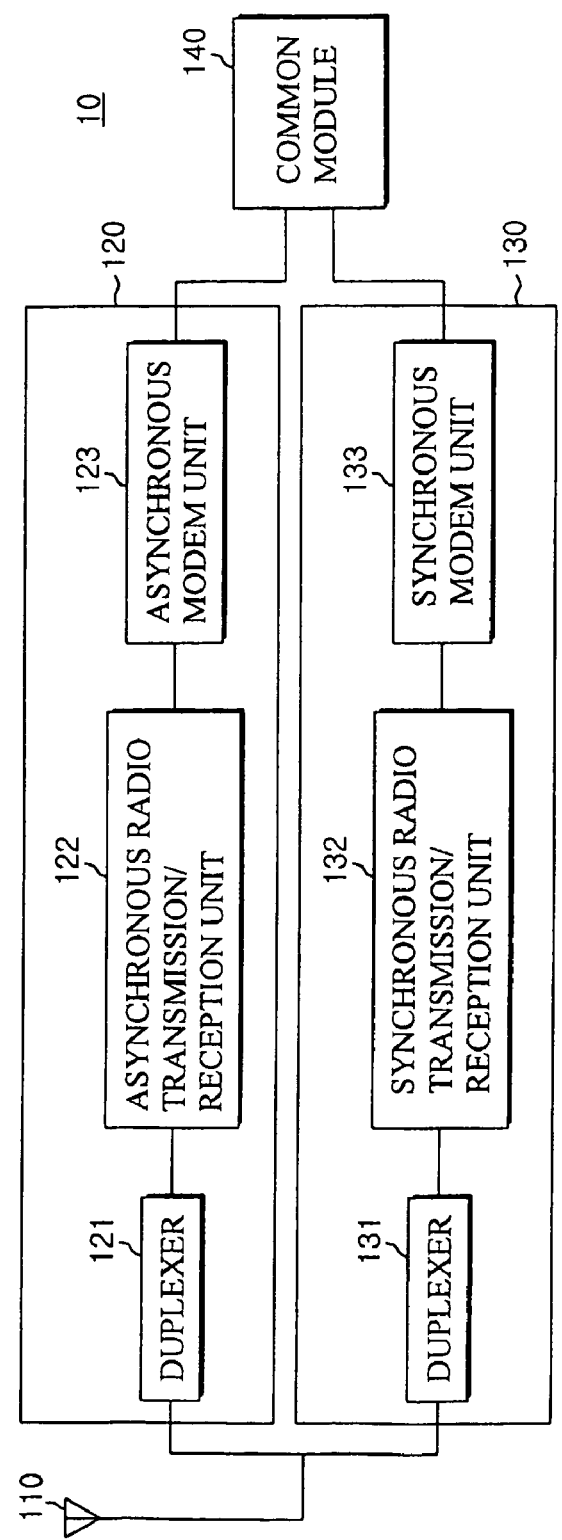
FIGS. 2 and 3 are views showing the construction of a mobile communication terminal applied to the present invention.

FIG. 2 is a view of an example of a mobile communication terminal applied to the present invention, which shows the case in which functional units for radio communication with asynchronous and synchronous networks are independently implemented.

As shown in FIG. 2, a DBDM mobile communication terminal 10 applied to the present invention includes an antenna 110, an asynchronous mobile communication service module 120, a synchronous mobile communication service module 130 and a common module 140.

The antenna 110 is capable of simultaneously processing frequency bands for synchronous and asynchronous mobile communication services.

The asynchronous module 120 includes a duplexer 121 functioning as a band pass filter for separately processing individual frequencies, an asynchronous radio transmission/reception unit 122 for separating transmission/reception radio waves into preset frequency bands, and an asynchronous modem unit 123 for processing wireless section protocol with an asynchronous mobile communication system. The synchronous module 130 includes a duplexer 131 functioning as a band pass filter for separately processing individual frequencies, a synchronous radio transmission/reception unit 132 for separating transmission/reception radio waves into preset frequency bands, and a synchronous modem unit 133 for processing wireless area protocol with a synchronous mobile communication system.

The common module 140 includes an application processor that functions as a central processing unit for controlling the asynchronous modem unit 123 and the synchronous modem unit 133, an application processor for performing a multimedia function, memory, an input/output unit, and some other application processing units.

Further, in the DBDM mobile communication terminal 10, software used for user interface, additional services, mobility management, connection/session control, resource control, and protocol processing is installed, thus allowing a user to use various application services, performing handover, and converting protocols according to mobile communication systems.

In the mobile communication terminal according to this embodiment, the asynchronous modem unit 123 of the asynchronous module 120 and the synchronous modem unit 133 of the synchronous module 130 can be controlled by the common module 140. Further, either of the asynchronous and synchronous modem units 123 and 133 can control the entire mobile communication terminal.

Figure 3:
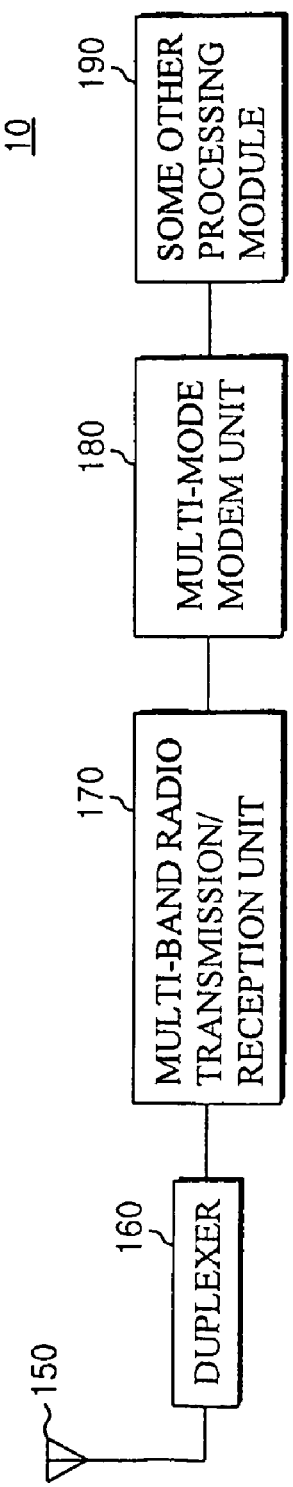

FIG. 3 is a view of another example of a mobile communication terminal applied to the present invention, which shows the case in which functional units for radio communication with asynchronous and synchronous networks are integrated.

As shown in FIG. 3, the DBDM mobile communication terminal 10 applied to the present invention includes an antenna 150, a duplexer 160, a multi-band radio transmission/reception unit 170, a multi-mode modem unit 180 and some other processing module 190.

The antenna 150 is capable of simultaneously processing frequency bands for synchronous and asynchronous mobile communication services.

The duplexer 160 functions as a band pass filter for separately processing frequencies from the asynchronous network and frequencies from the synchronous network. The multi-band radio transmission/reception unit 170 separates transmission/reception radio waves into preset frequency bands. The multi-mode modem unit 180 processes wireless section protocol with the asynchronous mobile communication system or the synchronous mobile communication system.

The processing module 190 includes an application processor that functions as a central processing unit for controlling the multi-mode modem unit 180 and includes an application processor for performing a multimedia function, memory, an input/output unit, and some other application processing units.

Further, in the DBDM mobile communication terminal 10, software used for user interfaces, additional services, mobility management, connection/session control, resource control, and protocol processing is installed, thus allowing a user to use various application services, performing handover, and converting protocols according to mobile communication systems.

As described above, if the radio transmission/reception units and the modem units are integrated, several advantages can be realized, such as the reduction of the size of the mobile communication terminal 10, the reduction of power consumption and the sharing of modem memory.

Figure 4A:
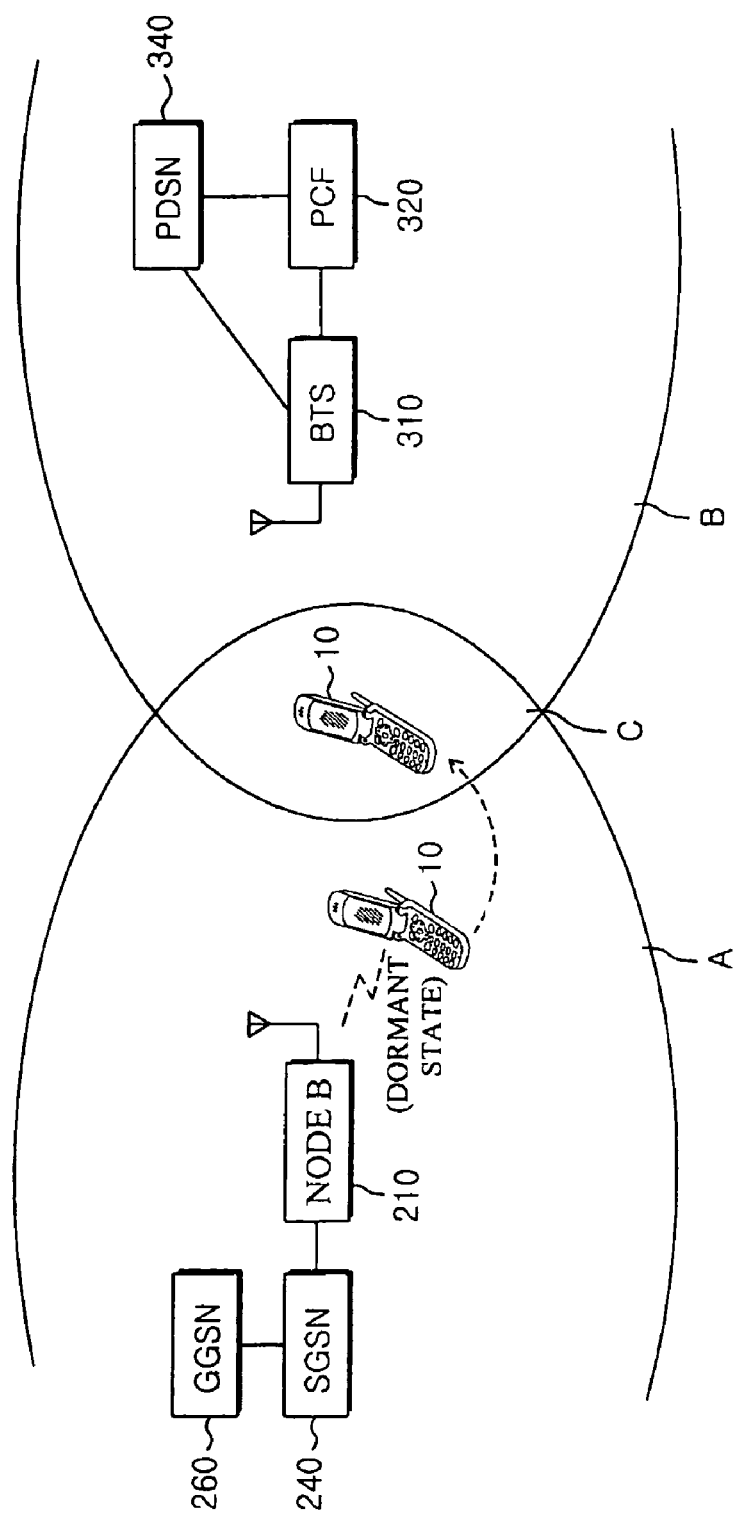
FIGS. 4A and 4B are conceptual views showing handover of a mobile communication terminal in a dormant state in a mobile communication network in which asynchronous and synchronous networks coexist according to embodiments of the present invention.
Figure 4B:
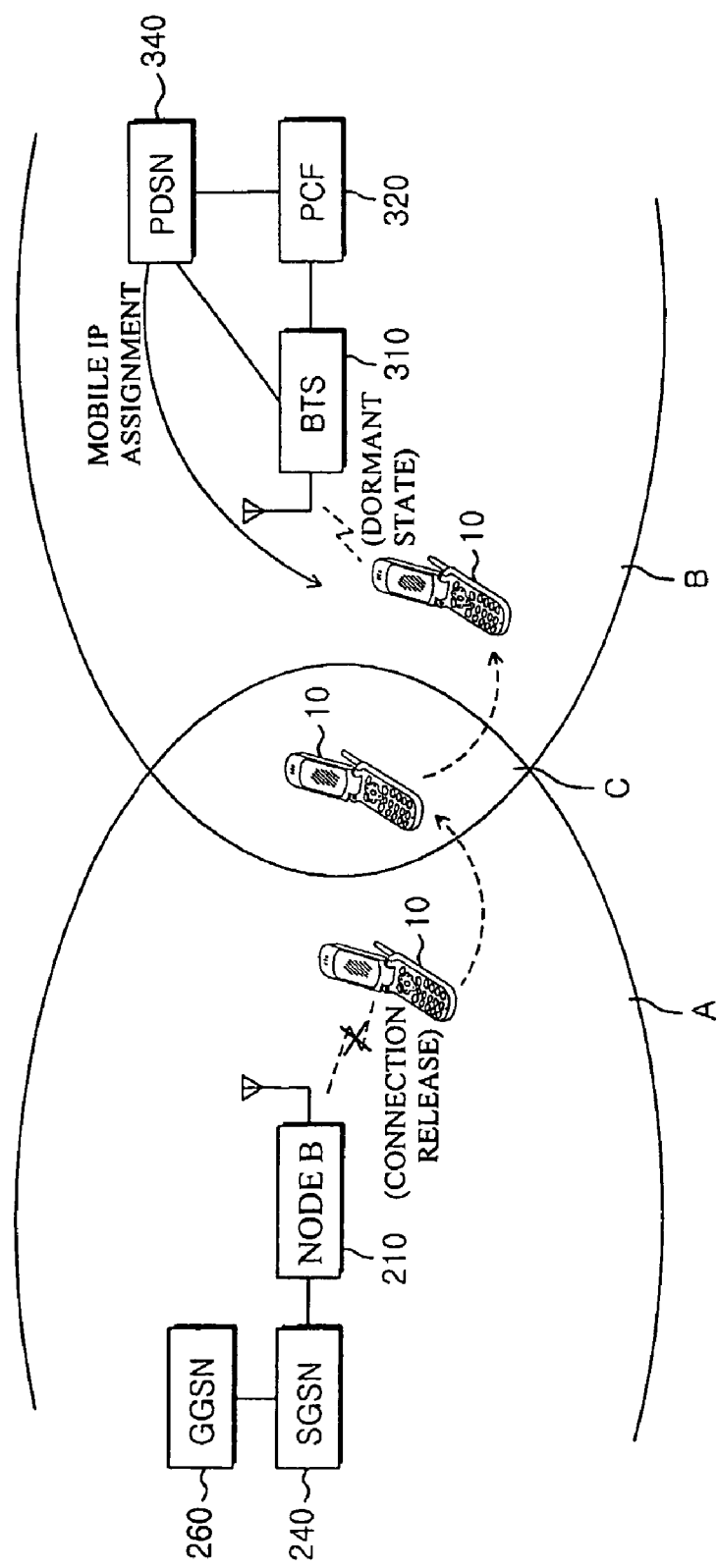

FIGS. 4A and 4B are conceptual views showing handover of a mobile communication terminal in a dormant state in a mobile communication network in which asynchronous and synchronous networks coexist.

In a single mobile communication system, "handover" (or "handoff") means technology allowing a user to communicate without interruption when a mobile communication terminal moves from one cell of a mobile communication system to another cell thereof. The present invention relates to a handover method for a DBDM mobile communication teal in a network in which synchronous and asynchronous mobile communication systems coexist. Of the cases in which the mobile communication terminal 10 moves from a synchronous area B into an asynchronous area A, and in which the mobile communication terminal 10 moves from an asynchronous area A into a synchronous area B, the latter is described in detail.

Referring to FIG. 4A, the mobile communication terminal establishes a session with the node B 210 in the asynchronous area A, is assigned a mobile IP, and enters a dormant state, in which the mobile communication terminal is connected to the IP network 40 through the SGSN 240 and the GGSN 260 and can use the packet data service provided by the CP server 50, if a data signal is generated.

As the mobile communication terminal 10 gradually moves into the synchronous area B through an overlap area C between the asynchronous and synchronous areas A and B, transmission/reception power between the node B 210 of the asynchronous mobile communication system and the mobile communication terminal 10 gradually attenuates. The asynchronous mobile communication system, having sensed the power attenuation, or the synchronous mobile communication system, having sensed die approach of the mobile communication terminal, notifies the SGSN/GGSN 240/260 of the asynchronous mobile communication system that handover is required.

Accordingly, the SGSN/GGSN 240/260 commands the BTS 310 of the synchronous mobile communication system 310 to perform handover, so that call setup and trunk setup are performed between the mobile communication terminal and die synchronous mobile communication system. Thereafter, as shown in FIG. 4B, a mobile IP is assigned by the PDSN 340 to the mobile communication terminal, so that the mobile communication terminal remains in a dormant state with respect to the synchronous mobile communication system.

Consequently, the mobile communication terminal, handed over to the synchronous mobile communication system area B, completely releases the connection to the asynchronous mobile communication system, and remains in a dormant state in the synchronous mobile communication system. Thereafter, if a data signal is generated, the mobile communication terminal makes a transition to an active state to immediately use the packet data service.

Figure 5A:
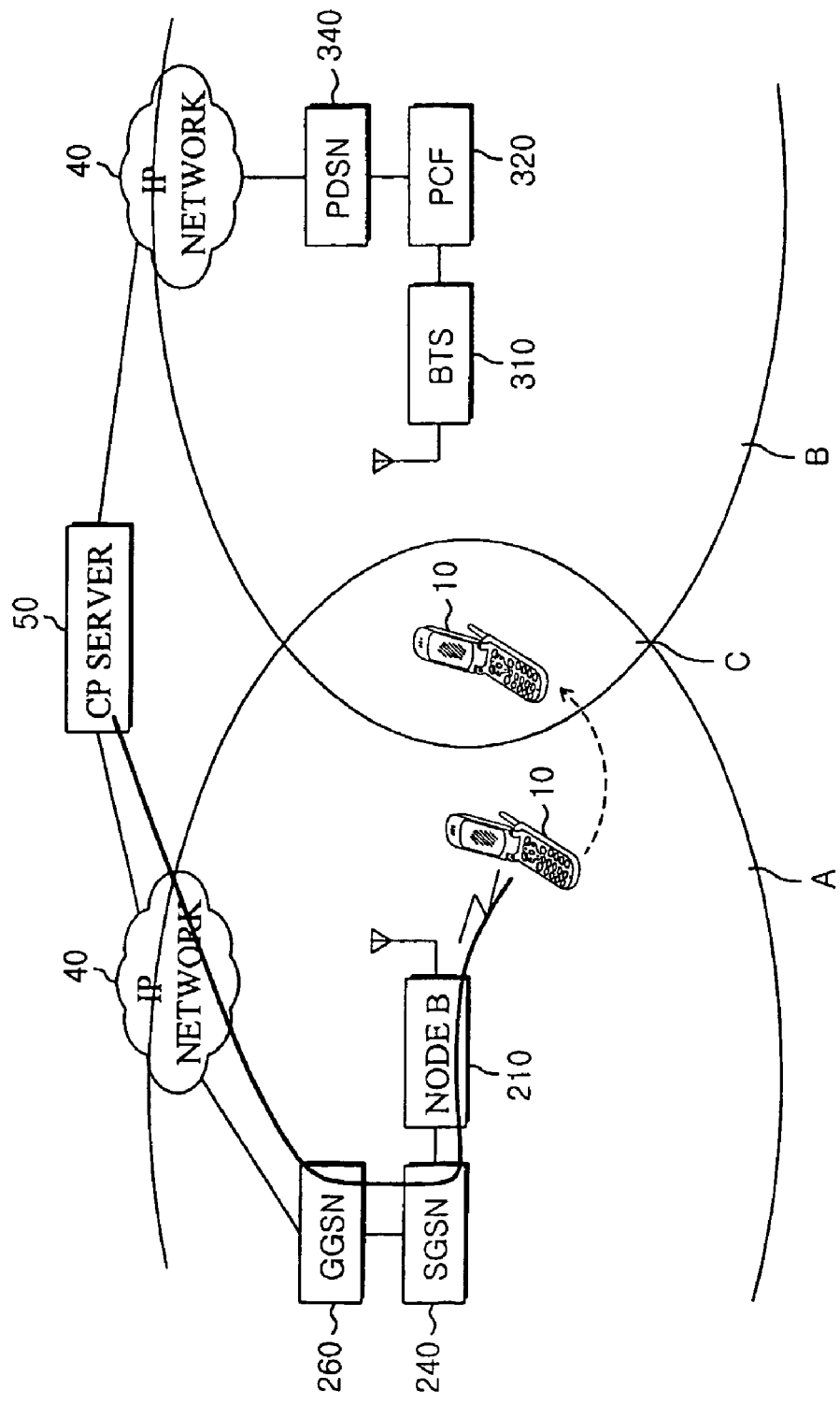
FIGS. 5A and 5B are conceptual views showing handover of a mobile communication terminal using a packet data service in a mobile communication network in which asynchronous and synchronous networks coexist according to embodiments of the present invention.
Figure 5B:
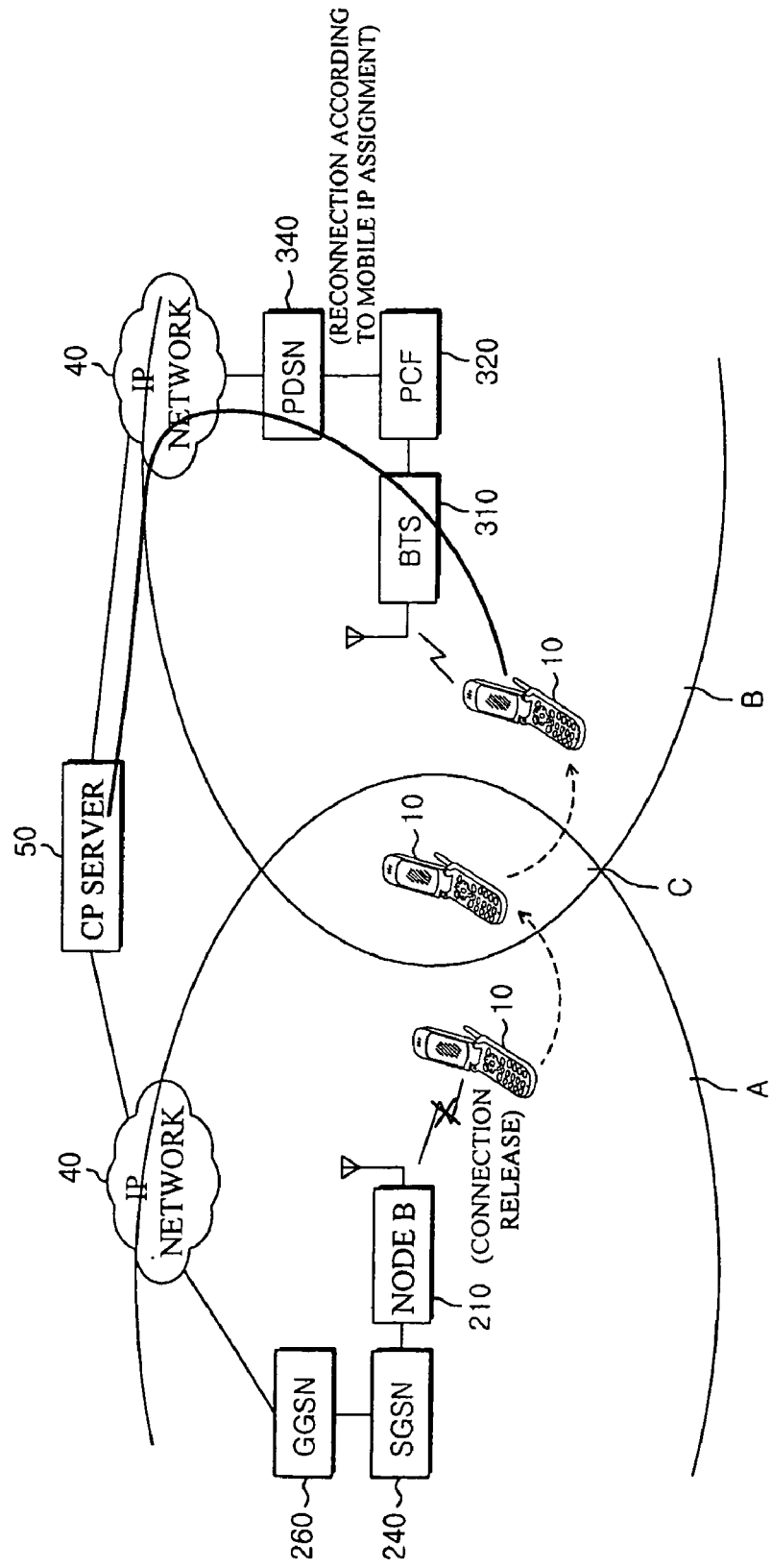

FIGS. 5A and 5B are conceptual views showing handover of a mobile communication terminal using a packet data service in a mobile communication network in which asynchronous and synchronous networks coexist.

Referring to FIG. 5A, the mobile communication terminal establishes a session with the node B 210 in the asynchronous area A and is assigned a mobile IP. If a data signal is generated, the mobile communication terminal is in a dormant state in which it is connected to the IP network 40 through the SGSN 240 and GGSN 260 and can use the packet data service provided by the CP server 50, or in a state in which the mobile communication terminal is connected to the IP network 40 through the node B 210, the SGSN 240 and the GGSN 260 and is using the packet data service provided by the CP server 50. Thereafter, as the mobile communication terminal 10 approaches the synchronous area B through the overlap area C between the asynchronous and synchronous areas A and B, transmission/reception power between the node B 210 of the asynchronous mobile communication system and the mobile communication terminal 10 gradually attenuates. The asynchronous mobile communication system, having sensed the power attenuation, requests the synchronous mobile communication system to perform handover. The synchronous mobile communication system, having received the handover request, assigns a channel to the mobile communication terminal 10 so as to provide the packet data service.

When channel assignment has been completed between the synchronous mobile communication system and the mobile communication terminal 10, the asynchronous mobile communication system directs the mobile communication terminal to perform handover, thus handing over the mobile communication terminal to the synchronous mobile communication system. When the mobile communication terminal is completely connected to the synchronous mobile communication system, the synchronous mobile communication system notifies the asynchronous mobile communication that handover has been completed. Accordingly, the node B 210 of the asynchronous mobile communication system releases the connection to the mobile communication terminal 10. Further, the mobile communication terminal assigned anew mobile IP through the PDSN and HA of the synchronous mobile communication system to continuously use the packet data service.

Consequently, referring to FIG. 5B, the mobile communication terminal, handed over to the synchronous mobile communication system area B, completely releases the connection to the asynchronous mobile communication system, and can continuously use the packet data service provided by the CP server 50 through the BTS 310, the PCF 320, the PDSN 340 and the IP network 40.

Figure 6:
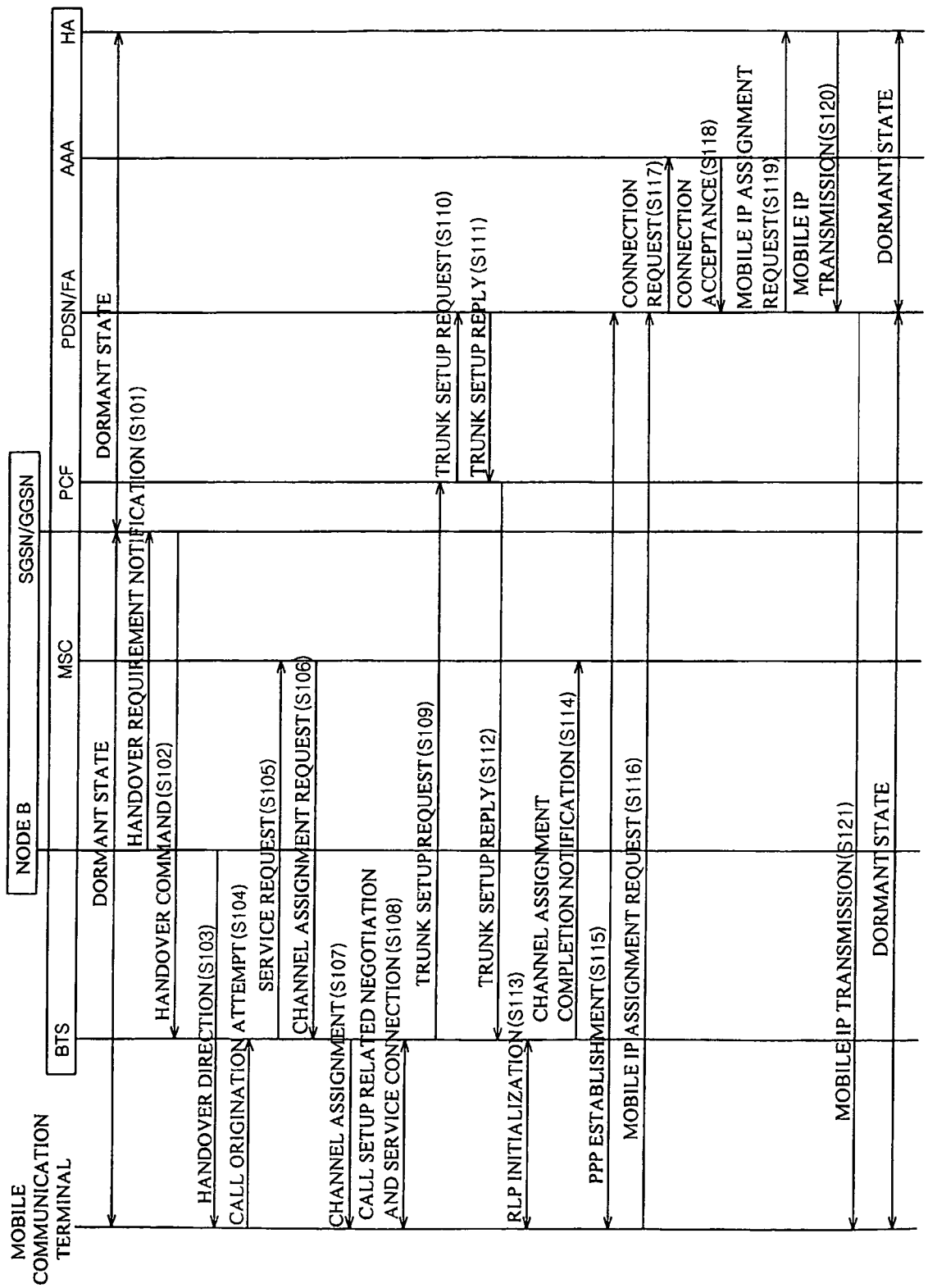
FIG. 6 is a flowchart of a handover method for a mobile communication terminal in a dormant state according to an embodiment of the present invention.

FIG. 6 is a flowchart of a handover method for a mobile communication terminal in a dormant state according to an embodiment of the present invention.

As the mobile communication terminal 10 in a dormant state in the asynchronous network moves into a synchronous network area, the node B 210 of the asynchronous network senses the attenuation of transmission/reception power between the node B 210 and the mobile communication terminal 10, determines that handover is required, and notifies the SGSN/GGSN 240/260 of the requirement for handover, thus indicating that die mobile communication terminal is leaving the asynchronous area (Serving Radio Network Subsystem: SRNS Relocation Requited) at step S101. In this case, the identification number of the mobile communication terminal 10 is also transmitted. Further, the step S101 of notifying the SGSN/GGSN 240/260 that handover is required can be performed by the BTS 310 of the synchronous mobile communication system, heaving sensed the approach of the mobile communication terminal.

The SGSN/GGSN 240/260, notified of the requirement for handover, commands the BTS 310 of the synchronous network to perform handover (SRNS Relocation Command) at step S102. Further, the node B 210 directs the mobile communication terminal to perform handover (HANDOVER FROM UTRAN CMD) at step S103. This direction message includes a message related to the synchronous mobile communication system, in particular, information about channel assignment, traffic channel entry, etc.

Thereafter, the mobile communication terminal attempts to originate a call to the BTS 310 using an Origination Message (ORM) (ORM[DRS=1]) at step S104, so that call processing and channel assignment are executed between the BTS 310 and the MSC 330. In detail, the BTS 310 transmits a service request message to the MSC 330 in response to the call origination attempt by the mobile communication terminal (Connection Management: CM Serv. Req.) at step S105. The MSC 330 requests the BTS 310 to assign a channel (Assign. Req.) at step S106, and the BTS 310, having received the channel assignment request, transmits a channel assignment message to the mobile communication terminal (ECAM: Extended Channel Assignment Message) at step S107.

Next, a negotiation related to call processing and setup is performed between the mobile communication terminal (synchronous module) and the BTS 310 of the synchronous mobile communication system (negotiate and connect service) at step S108, and a trunk setup procedure is performed. The trunk setup procedure can be performed through an A-interface. In detail, if the BTS 310 requests the packet controller (PCF) 320 to set up a trunk (A9 Setup-A8) at step S109, the packet controller 320 requests the PDSN 340 to set up a trunk and receives a reply to the trunk setup request (A11 RRQ, A11 RRP) at steps S110 and S111. The packet controller 320 transmits a reply signal, received from the PDSN 340, to the BTS 310 (A9 Connect-A8) at step S112.

In this way, when the trunk setup is completed, the initialization of a Radio Link Protocol (RLP) is performed (RLP initialization) between the mobile communication terminal 10 and BTS 310 at step S113. The BUSS 310 notifies the MSC 330 that channel assignment has been completed (Assignment complete) at step S114. Then, PPP setup is performed between the mobile communication terminal and the PDSN 340 (PPP establishment) at step S115, so that a new packet data call is set up, and then a mobile IP assignment procedure is performed.

The mobile IP assignment procedure is described in detail. The mobile communication terminal requests the packet controller 320 to assign a mobile IP (MIP registration request) at step S116. Therefore, the packet controller 320 requests the Authentication Authorization Account (AAA) unit 360 to authenticate the mobile communication terminal (Access Request) at step S117.

Accordingly, the AAA unit 360 verifies the legality of the mobile communication terminal, and transmits verification results to the PDSN 340 (Access Reply) at step S118. If the mobile communication terminal is an acceptable terminal as determined by the legality verification received from the AAA unit 360, the PDSN 340 requests the home agent 350 to assign a mobile IP and receives a reply to the mobile IP assignment request (MIP RRQ/RRP) at steps S119 and S120. In this way, if the mobile IP is assigned, the assigned mobile IP is transmitted to the mobile communication terminal (MIP registration reply) at step S121.

Accordingly, the mobile communication terminal completely releases the connection to the asynchronous mobile communication system 20, is assigned a new mobile IP by the synchronous mobile communication system, and remains in a dormant state.

Figure 7:
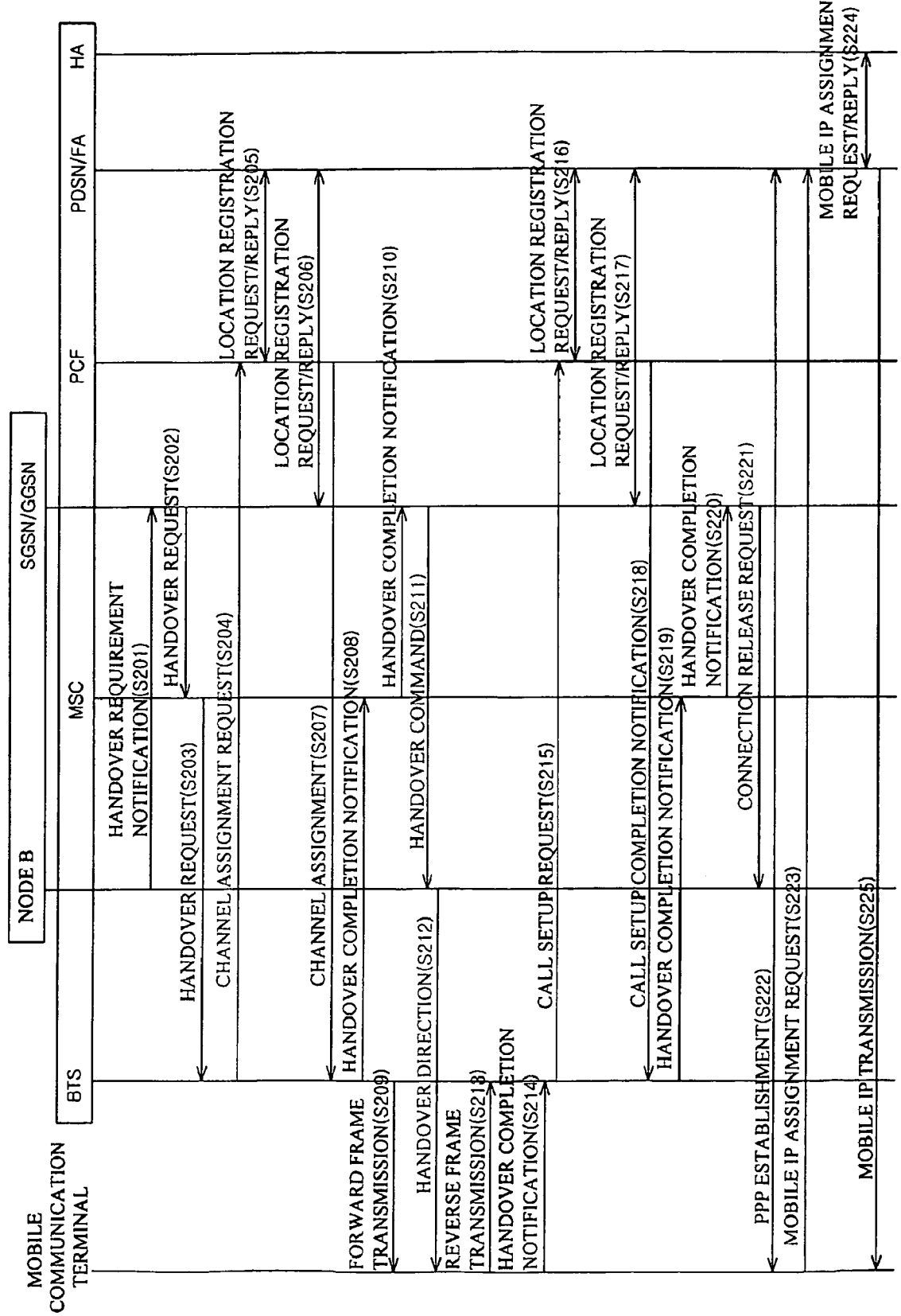
FIG. 7 is a flowchart of a handover method for a mobile communication terminal using a packet data service according to an embodiment of the present invention.

FIG. 7 is a flowchart of a handover method for a mobile communication terminal using a packet data service according to an embodiment of the present invention.

As the mobile communication terminal 10 that is using a packet data service in the asynchronous network moves into the synchronous network area, the node B 210 of the asynchronous network determines that handover is required on the basis of the attenuation of transmission/reception power between the node B 210 and the mobile communication terminal 10, and notifies the SGSN/GGSN 240/260 that handover is required (SRNS Relocation Required) at step S201. In this case, the identification number of the mobile communication terminal is also transmitted, and the SGSN/GGSN 240/260 requests the MSC 330 of the synchronous network to perform handover (FACDIR2) at step S202.

Accordingly, the MSC 330 requests the BTS 310 to perform handover (Handoff Request), and the BTS 310 performs a procedure of setting control signals and traffic for the transmission of packet data in the synchronous network. For this operation, the BTS 310 requests the packet controller (PCF) 320 to assign a channel (A9-setup) at step S204. Accordingly, the packet controller (PCF) 320 requests location registration from the PDSN/FA 340, and receives results of the location registration request (A11-Reg. Req/reply) at step S205. The PDSN/FA 340 requests location registration from the SGSN/GGSN 240/260 and receives a reply to the location registration request (Registration req/reply) at step S206, and then transmits channel assignment information to the BTS 310 (A9-Connect) at step S207.

As described above, when channel assignment is completed, the BTS 310 notifies the MSC 330 that handover has been completed (Handoff Req. Ack) at step S208, and assigns a forward channel to the mobile communication terminal by transmitting a null frame to the mobile communication terminal through a forward fundamental channel (F-FCHf) for the transmission of forward traffic (F-FCH frames) at step S209.

Further, the MSC 330, notified of the completion of handover, notifies the SGSN/GGSN 240/260 that handover has been completed (facdir2) at step S210. The SGSN/GGSN 240/260, having received the handover completion notification, commands the node B 210 to perform handover (SRNS Relocation Command) at step S211.

Thereafter, the node B 210 directs the mobile communication terminal to perform handover (HANDOVER FROM UTRAN CMD) at step S212. This direction message includes a message related to the synchronous mobile communication system, in particular, information about channel assignment. The mobile communication terminal, having received the handover direction message, directs the synchronous module to prepare to communicate with the synchronous mobile communication system, switches to the synchronous mode, and transmits frames to the BTS 310 of the synchronous mobile communication system through a Reverse Fundamental Channel (R-FCH) (R-FCH frames) at step S213. Thereafter, the mobile communication terminal notifies the BTS 310 that handover has been completed (HCM) at step S214. Accordingly, the connection between the mobile communication terminal 10 and the synchronous mobile communication system 30 is established.

Next, the BTS 310 performs a procedure of setting up a call with the packet network of the synchronous mobile communication system. First, if the BTS 310 requests the packet controller (PCF) 320 to set up a call (A-9 connected) at step S215, the packet controller (PCF) 320 requests location registration from the PDSN/FA 340, and receives results of the location registration request (A11-Reg. Req/reply) at step S216. Further, the PDSN/FA 340 requests location registration from the SGSN/GGSN 240/260, and receives a reply to the location registration request (Registration req/reply) at step S217.

Thereafter, the packet controller (PCF) 320 notifies the BTS 310 that call setup has been completed (A-9 connected Ack) at step S218. The BTS 310 notifies the MSC 330 that handover has been completed (Handoff Complete) at step S219. The MSC 330 notifies the SGSN/GGSN 240/260 that handover has been completed (Handoff Complete, MSONCH) at step S220. Then, the SGSN/GGSN 240/260 requests the node B 210 to release the connection to the mobile communication terminal (Iu Release Cmd) at step S221.

Accordingly, if the service provided by the asynchronous mobile communication system 20 to the mobile communication terminal is released, the mobile communication terminal performs PPP establishment with the PDSN 340 (PPP establishment) at step S222, thus setting up a new packet data call. If the new packet data call is set up, the mobile communication terminal requests the packet controller (PCF) 320 to assign a mobile IP (MIP registration request) at step S223. Accordingly, the packet controller (PCF) 320 requests the HA 350 to assign a mobile IP and receives a reply to the request (MIP RRQ/RRP) at step S224, and then transmits an assigned mobile IP to the mobile communication terminal (MIP registration reply) at step S225.

Figure 8:
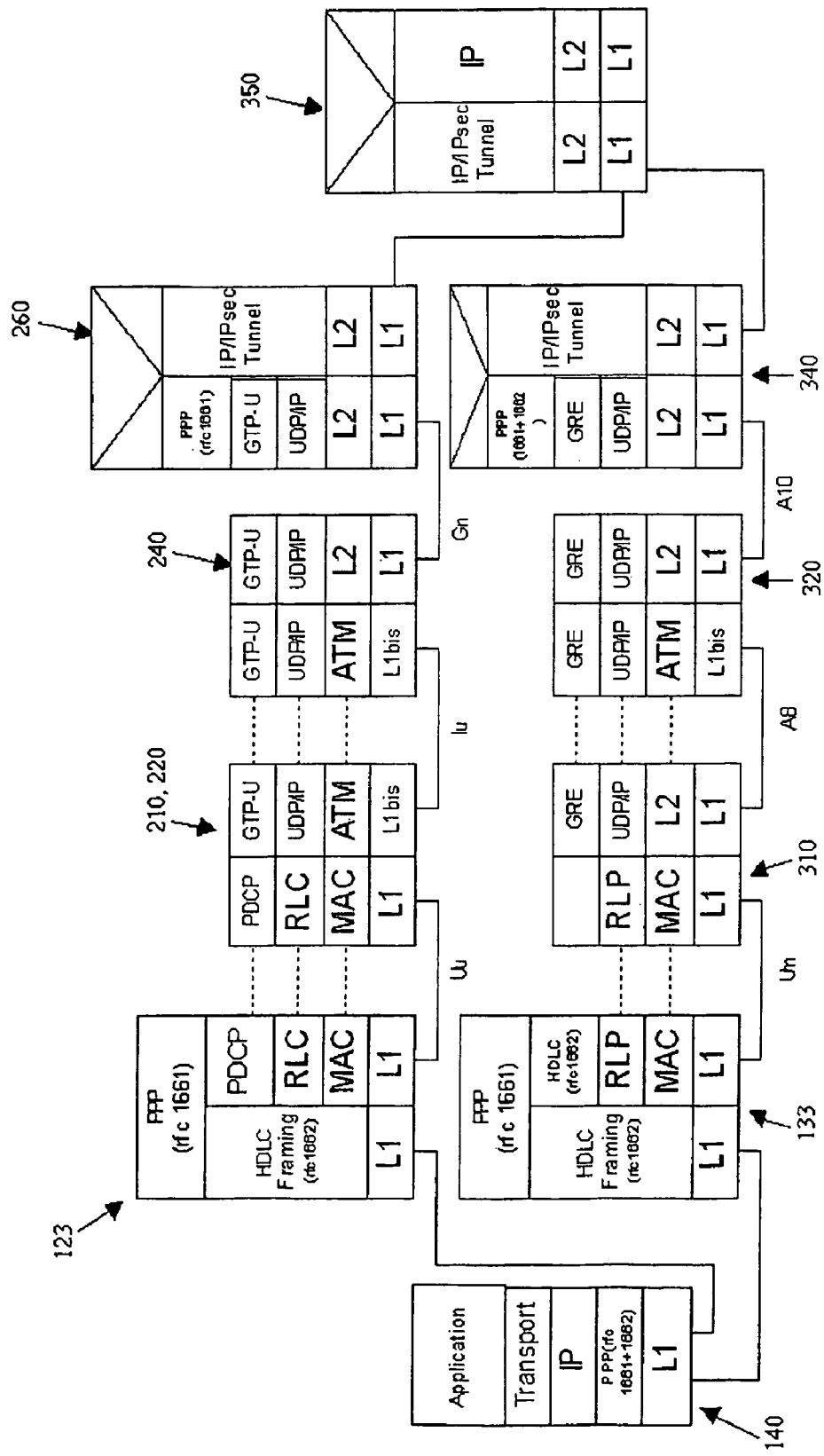
FIGS. 8 and 9 are views showing examples of a protocol stack applied to a mobile communication system according to the present invention.
Figure 9:
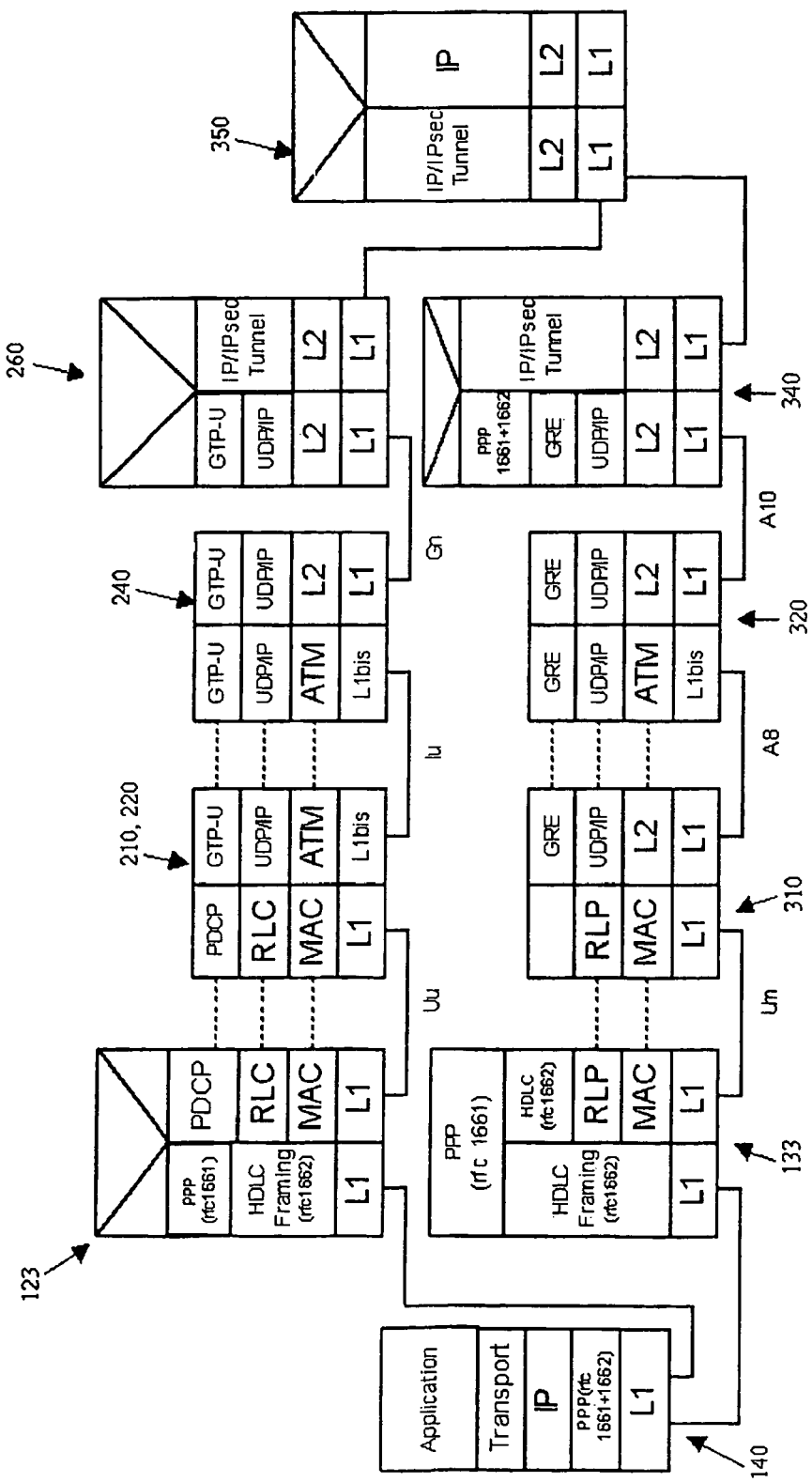

Accordingly, the mobile communication terminal completely releases the connection to the asynchronous mobile communication system 20, and can continuously use the packet data service provided by the CP server through the BTS, the packet controller (PCF), the PDSN and the IP network. FIGS. 8 and 9 are views of examples of a protocol stack applied to the mobile communication system according to the present invention, which shows a user plane protocol stack applicable to the case in which a common module 140 is constructed to control a DBDM mobile communication terminal in the DBDM mobile communication terminal of FIG. 2.

First, FIG. 8 illustrates the case in which a PPP is used as a Packet Data Protocol (PDP) type in an asynchronous mobile communication system. A protocol stack can be easily implemented by constructing an interface between the asynchronous mobile communication system and the home agent 350.

For a protocol stack for communicating with the IP network 40, the home agent 350 includes an L1 layer (physical layer) for performing coding and modulation, an L2 layer for processing replies to accurately transmit messages, and an IP layer. Further, for a protocol stack for communicating with the GGSN 260 of the asynchronous network and the PDSN 340 of the synchronous network, the home agent 350 includes an L1 layer, an L2 layer, and an IP tunneling layer for tunneling the L2 layer.

The GGSN 260 of the asynchronous network includes an L1 layer, an L2 layer, a User Datagram Protocol (UDP)/Internet Protocol (IP) layer for performing message exchange in a system that transmits data using IP to correspond to the IP tunneling layer of the home agent 350, a GPRS Tunneling Protocol (GTP)-U layer for defining the flow of packet data and information, and a Point-to-Point Protocol (PPP) layer for performing packet compression, authentication, IP assignment, etc. for data communication.

Further, the SGSN 240 is connected to the GGSN 260 through a Gn interface, includes an L1bis layer corresponding to the L1 layer, and an Asynchronous Transfer Mode (ATM) layer for performing the generation, extraction and exchange of packet data to correspond to the L2 layer so as to convert protocols used in the GGSN 260, and does not perform protocol conversion with respect to the data used in other layers (UDP/IP and GTP-U).

Next, the node B and the RNC 210 and 220 are connected to the SGSN 240 through an Iu interface, and include an L1 layer corresponding to the L1bis layer, a Media Access Control (MAC) layer for assigning radio resources for multimedia data processing to correspond to the ATM layer, a Radio Link Control (RLC) layer for establishing a radio link with the mobile communication terminal and combining and dividing packet data to correspond to the UDP/IP layer, and a Packet Data Convergence Protocol (PDCP) layer for compressing a packet data header to correspond to the GTP-U protocol, so as to convert protocols used in the SGSN 240.

Furthermore, the asynchronous modem unit 123 of the mobile communication terminal does not perform protocol conversion with respect to an L1 layer and includes an HDLC framing layer for performing link management for link connection and disconnection, synchronization problem solution, flow control, error control, etc. to correspond to the MAC/RLC/PDCP layers, so as to convert protocols used in the node B/RNC, and includes a PPP layer for receiving data through the PPP layer of the GGSN 260.

In the meantime, the PDSN 340 includes an L1 layer, an L2 layer, a UDP/IP layer for performing message exchange in a system that transmits data using IP to correspond to the IP tunneling layer, a Generic Routing Encapsulation (GRE) layer for encrypting and compressing packets, and a Point-to-Point Protocol (PPP) layer for performing packet compression, authentication, IP assignment, etc. for data communication, so as to convert protocols used in the home agent 350.

The packet controller (PCF) 320 is connected to the PDSN 340 through an A-interface (A10), includes an L1 bis layer corresponding to the L1 layer and an ATM layer for perfuming the generation, extraction and exchange of packet data to correspond to the L2 layer so as to convert protocols used in the PDSN 340, and does not perform protocol conversion with respect to data used in other higher UDP/IP and GRE layers.

Further, the BTS 310 is connected to the packet controller (PCF) 320 through an A-interface (A8), and includes an L1 layer corresponding to the L1bis layer, a MAC layer for assigning radio resources for multimedia data processing to correspond to the ATM layer, and an RLP layer, for requesting the retransmission of erroneous frames to prevent errors from occurring in a wireless section, to correspond to the UDP/IP layer, so as to convert protocols used in the PCF 320.

In addition, the synchronous modem unit 133 of the mobile communication terminal does not performing protocol conversion with respect to an L1 layer and includes an HDLC framing layer for performing link management for link connection and disconnection, synchronization problem solution, flow control and error control, etc. to correspond to the MAC/RLP layers so as to convert protocols used in the BTS/PCF, and includes a PPP layer for receiving data through the PPP layer of the GGSN 260.

Finally, the common module 140 of the mobile communication terminal includes an L1 layer, a PPP layer, an IP layer, a transport layer and an application layer so as to convert protocols of data received from the asynchronous modem unit 123 and the synchronous modem unit 133.

In this embodiment, it can be seen that both the asynchronous modem unit 123 and the synchronous modem unit 133 perform only a communication function, and the common module establishes the protocols of higher PPP and IP layers.

Next, FIG. 9 illustrates the case in which a Packet Data Protocol (PDP)-type IP is used in the asynchronous mobile communication system, which shows a protocol stick when a PPP is not used. In this embodiment, it can be seen that, since the asynchronous mobile communication system does not use a PPP, a PPP layer is not used in either the GGSN 260 or the asynchronous modem unit 123 of the mobile communication terminal, unlike FIG. 8.

In the present invention, a procedure of establishing a new PPP and assigning a mobile IP to a mobile communication terminal in a synchronous network is performed to support handover from an asynchronous network to the synchronous network during the use of a packet data service, thus providing continuous packet data service to the mobile communication terminal.

As described above, those skilled in the art will appreciate that the present invention can be implemented with other embodiments without changing the technical spirit or essential features thereof. Therefore, the above-described embodiments should be appreciated as having been disclosed for illustrative purposes and are not restrictive. Those skilled in the art will appreciate that the scope of the present invention is defined by the accompanying claims rather than the above detailed description, and various modifications, additions and substitutions, derived from the meaning and scope of the claims and equivalent concepts thereof, belong to the scope of the present invention.

INDUSTRIAL APPLICABILITY

As described above, the present invention allows a dual-band dual-mode mobile communication terminal to remain in a dormant state even after the mobile communication terminal is handed over to a synchronous mobile communication system when the mobile communication terminal is in a dormant state in a mobile communication network in which asynchronous and synchronous mobile communication systems coexist, thus allowing the mobile communication terminal to immediately react to a packet data service. Further, if a mobile communication terminal using a packet data service is handed over, a new mobile IP is assigned to the mobile communication terminal to provide continuous service, thus improving the quality of service.

The invention claimed is:

1. A handover method for providing a packet data service to a dual-band dual-mode mobile communication terminal having an asynchronous modem unit and a synchronous modem unit in a mobile communication network in which asynchronous and synchronous mobile communication systems coexist, the method comprising:

the first step of, as the mobile communication terminal in a dormant state with respect to the asynchronous mobile communication system moves into an area of the synchronous mobile communication system, a Serving General packet radio service (GPRS) Support Node (SGSN)/Gateway GPRS Support Node (GGSN) of the asynchronous mobile communication system receiving information indicating that handover is required;

the second step of the SGSN/GGSN commanding a base station of the synchronous mobile communication system to perform handover;

the third step of the mobile communication terminal attempting to originate a call to the base station, thus executing call processing and channel assignment between the base station and a mobile switching center of the synchronous mobile communication system;

the fourth step of performing a negotiation related to call processing and setup between the mobile communication terminal and the base station;

the fifth step of the synchronous mobile communication system setting up a trunk;

the sixth step of initializing a radio link protocol between the mobile communication terminal and the base station;

the seventh step of the base station notifying the mobile switching center that channel assignment has been completed;

the eighth step of setting up a packet data call between the mobile communication terminal and a packet data service node of the synchronous mobile communication system; and the ninth step of the synchronous mobile communication system assigning a mobile IP to the mobile communication terminal.

2. The handover method according to claim 1, wherein the SGSN/GGSN is notified by a node B of the asynchronous mobile communication system or the base station of the synchronous mobile communication system that handover is required at the first step.

3. The handover method according to claim 1, wherein the SGSN/GGSN receives an identification number of the mobile communication terminal at the first step.

4. The handover method according to claim 1, wherein a message, including the handover command transmitted by the SGSN/GGSN to the mobile communication terminal at the second step, includes channel assignment information and traffic channel entry information.

5. The handover method according to claim 1, wherein the third step comprises the steps of:
the base station transmitting a service request message to the mobile switching center in response to the call origination attempt by the mobile communication terminal;
the mobile switching center requesting the base station to assign a channel; and
the base station transmitting a channel assignment message to the mobile communication terminal.

6. The handover method according to claim 1, wherein the fifth step comprises the steps of:
the base station requesting a packet controller of the synchronous mobile communication system to set up a trunk;
the packet controller requesting the packet data service node to set up a trunk, and receiving a reply to the trunk setup request; and
the packet controller transmitting a reply signal received from the packet data service node to the base station.

7. The handover method according to claim 1, wherein the ninth step comprises the steps of:
as the mobile communication terminal requests the packet controller of the synchronous mobile communication system to assign a mobile IP, the packet controller requesting an Authentication Authorization Account (AAA) unit of the synchronous mobile communication system to authenticate the mobile communication terminal;
the AAA unit verifying legality of the mobile communication terminal and transmitting results of legality verification to the packet data service node of the synchronous mobile communication system;

the packet data service node requesting a home agent of the synchronous mobile communication system to assign a mobile IP and receiving a reply to the request if the legality of the mobile communication terminal is verified; and the packet data service node transmitting the mobile IP assigned by the home agent to the mobile communication terminal.

8. A handover method for providing a packet data service to a dual-band dual-mode mobile communication terminal having an asynchronous modem unit and a synchronous modem unit in a mobile communication network in which asynchronous and synchronous mobile communication systems coexist the method comprising:

the first step of, as the mobile communication terminal that is connected to the asynchronous mobile communication system and using a packet data service moves into an area of the synchronous mobile communication system, and a handover event occurs, a node B of the asynchronous mobile communication system notifying a Serving General packet radio service (GPRS) Support Node (SGSN)/Gateway GPRS Support Node (GGSN) of the asynchronous mobile communication system that handover is required;

the second step of the SGSN/GGSN requesting a mobile switching center of the synchronous mobile communication system to perform handover, and the mobile switching center requesting the base station of the synchronous mobile communication system to perform handover;

the third step of the synchronous mobile communication system performing a procedure of setting control signals and traffic for transmission of packet data;

the fourth step of the base station notifying the mobile switching center that handover has been completed, and assigning a forward channel to the mobile communication terminal;

the fifth step of the mobile switching center notifying the SGSN/GGSN that handover has been completed;

the sixth step of, as the SGSN/GGSN commands the node B to perform handover, the node B directing the mobile communication terminal to perform handover;

the seventh step of the mobile communication terminal notifying the base station that handover has been completed if a reverse channel has been assigned and a connection has been established between the mobile communication terminal and the synchronous mobile communication system;

the eighth step of the synchronous mobile communication system performing call setup for a packet data service;

the ninth step of the base station notifying the synchronous mobile switching center that handover has been completed, and the mobile switching center notifying the SGSN/GGSN that handover has been completed;

the tenth step of the SGSN/GGSN requesting the node B to release a connection to the mobile communication terminal;

the eleventh step of the mobile communication terminal establishing a PPP with the packet data service node of the synchronous mobile communication system; and the twelfth step of assigning a mobile IP to the mobile communication terminal.

9. The handover method according to claim 8, wherein the third step comprises the steps of:
the base station requesting a packet controller of the synchronous mobile communication system to assign a channel;

the packet controller requesting location registration from the packet data service node of the synchronous mobile communication system and receiving results of the location registration request;

the packet data service node requesting location registration from the SGSN/GGSN and receiving a reply to the location registration request; and the packet controller transmitting channel assignment information to the base station.

10. The handover method according to claim 8, wherein a message, including the handover direction transmitted by the node B to the mobile communication terminal at the sixth step, includes information used for channel assignment between the mobile communication terminal and the synchronous mobile communication system.

11. The handover method according to claim 8, wherein the eighth step comprises the steps of:

the base station requesting the packet controller of the synchronous mobile communication system to set up a call;

the packet controller requesting location registration from the packet data service node of the synchronous mobile communication system and receiving results of the location registration request;

the packet data service node requesting location registration from the SGSN/GGSN and receiving a reply to the location registration request; and the packet controller notifying the base station that call setup has been completed.

12. The handover method according to claim 8, wherein the twelfth step comprises the steps of:

the mobile communication terminal requesting the packet data service node to assign a mobile IP;

the packet data service node requesting a home agent of the synchronous mobile communication system to assign a mobile IP and receiving a reply to the mobile IP assignment request; and the packet data service node transmitting the mobile IP assigned by the home agent to the mobile communication terminal.

\* \* \* \* \*